Sept. 3, 1946.  J. MORKOSKI  2,407,094
AGRICULTURAL IMPLEMENT
Filed May 15, 1944  4 Sheets-Sheet 3

Inventor:
James Morkoski.
By Paul O. Pippel,
Atty.

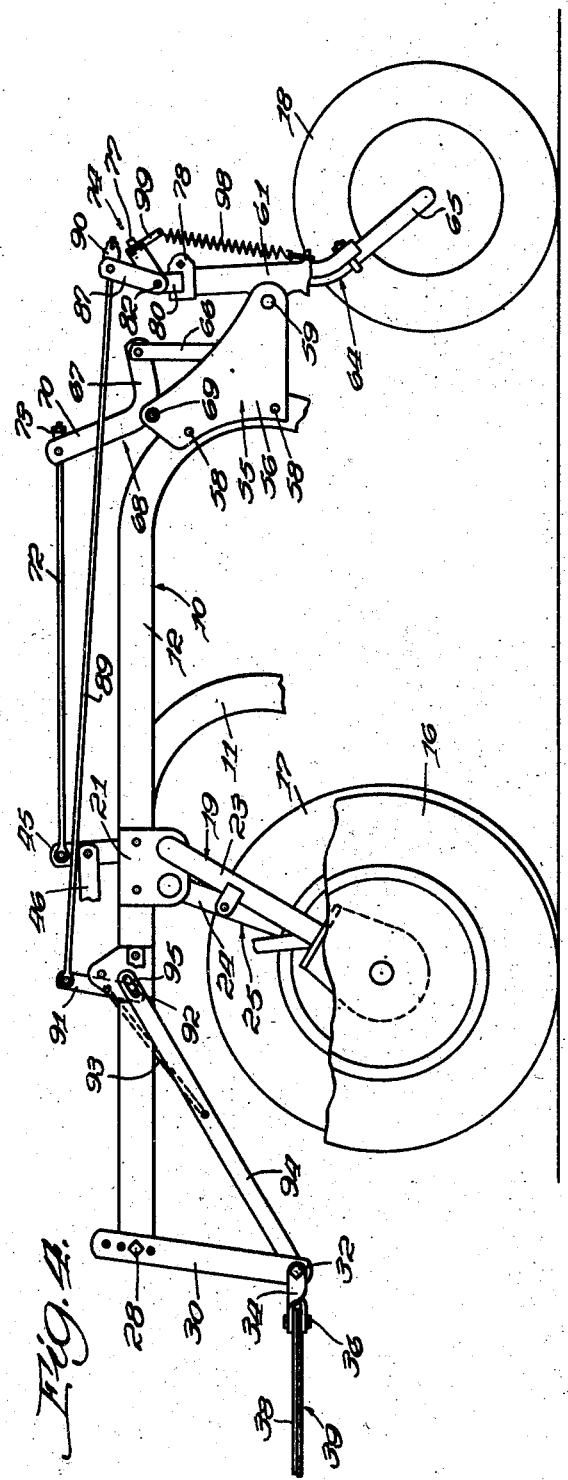

Patented Sept. 3, 1946

2,407,094

UNITED STATES PATENT OFFICE 2,407,094

AGRICULTURAL IMPLEMENT

James Morkoski, Canton, Ill., assignor to International Harvester Company, a corporation of New Jersey Application May 15, 1944, Serial No. 535,650

16 Claims. (Cl. 97—72)

1

This invention relates to agricultural implements and more particularly to rear furrow wheels for plows.

In the operation of plows having rear furrow wheels, it is customary when the plow is in ground-working position that the rear furrow wheel travel in a plane inclined from the vertical in order that the wheel may seat itself firmly against the furrow wall made by the plow bottom and absorb the side thrust on the plow. It is important when the plow is in this position that the furrow wheel travel in a straight line behind the plow and that it is not be permitted to caster. On the other hand, when the plow is to be turned, as at the end of a field, and it is raised to transport position for that purpose, it is highly desirable that the furrow wheel be permitted to caster and follow the direction of the plow in order to prevent scraping of the wheel over the ground and consequent injury thereto. Another desirable feature of a rear furrow wheel is that it not be permitted to caster when the plow is backed up. The importance of such a feature is readily apparent when it is considered that rearward movement is generally made for the purpose of avoiding or removing obstructions encountered in plowing or for backing the plow into a shed for storage purposes or the like. In such case, it is, of course, important that rearward movement be effected in a straight line and that castering of the rear furrow wheel be prevented.

It is, therefore, an object of the present invention to provide a rear furrow wheel that will not caster upon forward or rearward movement of the plow in operating position or upon backing up in transport position but which will caster only upon forward movement of the plow when in transport position.

Another object is to provide a rear furrow wheel that will caster only when draft is applied to move the plow forward in transport position.

Still another object is to provide a novel lock for a rear furrow wheel which is operative to lock the wheel against castering and which is releasable to permit castering under certain conditions.

A further object is to provide a novel hinged lock for a rear furrow wheel for plows which is so connected to the plow hitch structure as to be released in response to draft thereupon.

A still further object is to provide a novel hinged lock for a rear furrow wheel for plows, wherein a lost-motion connection with the plow hitch structure permits limited movement thereof prior to release of the lock in response to draft upon the hitch structure.

These and other objects will become apparent from a consideration of the following detailed description when read in conjunction with the accompanying drawings, wherein:

Figure 4 is a side elevation of the plow of the present invention with parts broken away to illustrate certain of the details of the present invention;

Figure 5 is a rear elevation of a portion of the furrow wheel supporting structure showing the hinged lock by which the furrow wheel may be prevented from castering; and Figure 6 is a section taken on the line 6 of Figure 5.

Figure 1:
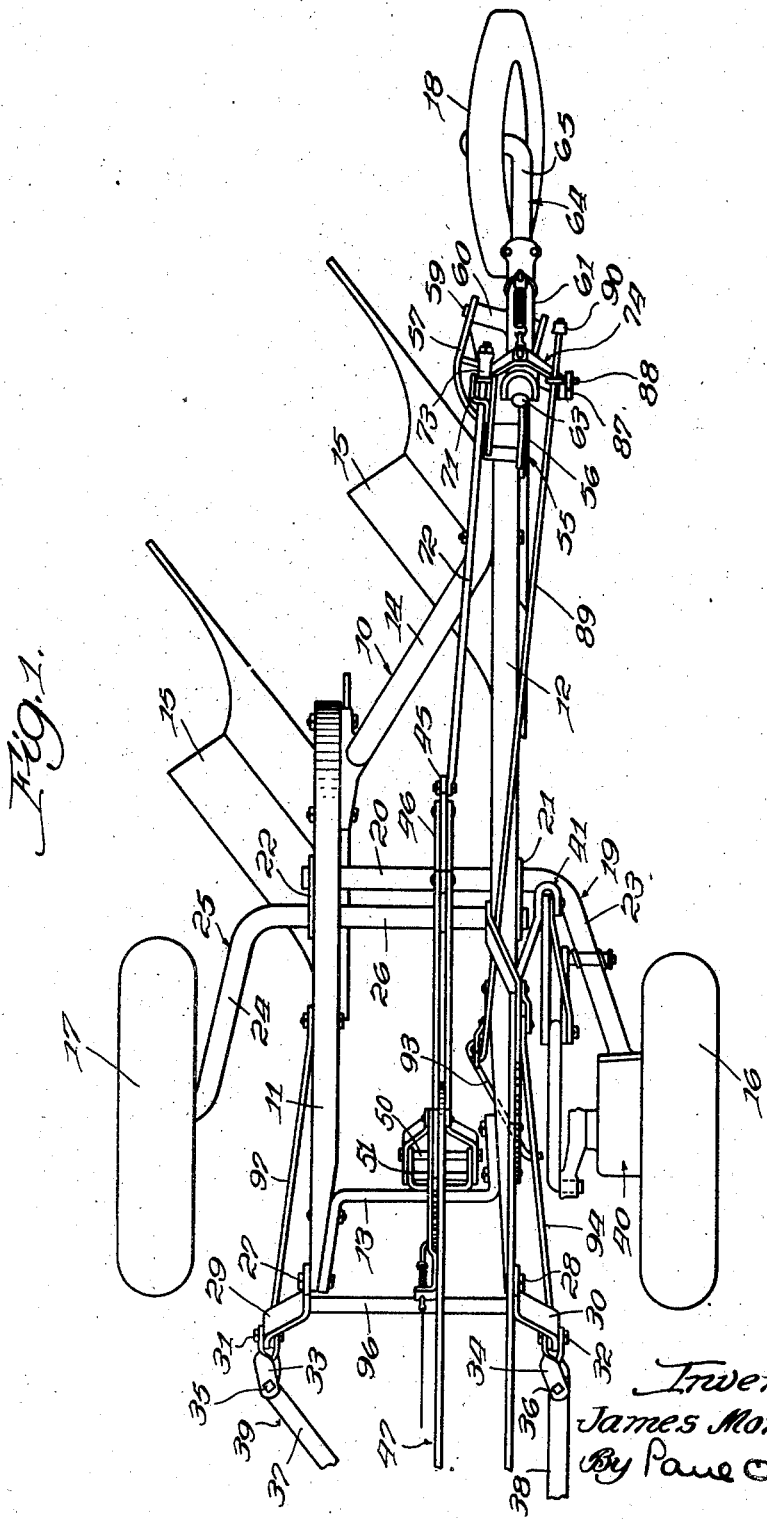
Figure 1 is a plan view of a plow embodying the features of the present invention.

Referring to the drawings, it will be noted that the numeral 10 designates generally the frame structure of the plow of the present invention. This frame comprises a pair of laterally spaced, longitudinally extending beams 11 and 12, the forward ends of which are rigidly connected by an angle brace 13. The rear end of beam 12 extends for some distance rearwardly of the end of beam 11, and these beams are further connected by a diagonally extending brace 14. The rear ends of beams 11 and 12 are curved downwardly and support at the lower ends thereof plow bottoms 15.

The frame 10 is supported by a land wheel 16, a furrow wheel 17, and a rear furrow wheel 18. Land wheel 16 is mounted upon a crank axle 19 having a transverse portion 20 rotatably mounted in brackets 21 and 22, affixed to the plow frame, and a crank portion 23 supporting wheel 16. Furrow wheel 17 is mounted upon the crank portion 24 of a crank axle 25 having a transverse portion 26 rotatably mounted in the brackets 21 and 22.

To the forward ends of beams 11 and 12, there are respectively pivotally attached by bolts 27 and 28 laterally spaced, downwardly extending straps 29 and 30. The lower ends of these straps are provided with bolts 31 and 32, upon which are respectively pivoted links 33 and 34. The forward ends of links 33 and 34 are pivotally connected by bolts 35 and 36 to forwardly extending bars 37 and 38 forming part of the plow hitch structure generally indicated at 39. While only a portion of hitch bars 37 and 38 is shown, it is understood that they are of conventional form, bar 38 extending in substantially a straight line forward and bar 37 extending diagonally across and connecting to bar 38 near its forward end. The plow of the present invention being of the trail-behind type, hitch structure 39 may be connected to any suitable source of draft power as, for example, a tractor, draft being exerted principally through the bar 38.

For raising and lowering the plow bottoms 15 to and from working position with respect to the land and furrow wheels, land wheel 16 is provided with a lifting mechanism indicated at 40, which may be of any conventional type connected by suitable linkage indicated at 41 to a lever and quadrant arrangement 42 mounted on the beam 12. While the plow bottoms may be lifted by operating the power lift mechanism 40, which causes crank axle 19 to swing vertically with respect to the plow frame, manual adjustments in the operating depth of the plow bottoms may be made by manipulation of the quadrant and lever arrangement 42. Power lift mechanism 40 is actuated by a lever 43 connected to a trip rope 44 extending forwardly within reach of an operator mounted upon the tractor or other source of draft power. However, it is to be understood that the details of the linkage 41, which connects the crank axle 19 to the plow frame, form no part of the present invention, and for a full disclosure of the details of operation thereof, reference may be had to copending United States application, Serial No. 535,649, filed May 15, 1944.

It is sufficient to say that power is transmitted from crank axle 19 to crank axle 25, supporting furrow wheel 17, through an arm 45 affixed to the transverse portion 20 of crank axle 19, this arm being connected by a link 46 to a lever and quadrant arrangement 47 in a manner hereinafter more fully set forth. This arrangement comprises a quadrant 48 pivoted upon the upper end of a member 49, which in turn is pivoted near its lower end upon a bolt 50 mounted in a bracket 51 affixed to the brace 13. Lever 52, likewise mounted upon the upper end of member 49, is curved at its lower end and has pivotally connected thereto the forward end of rearwardly extending link 46, the rear end of which is pivoted upon the arm 45 near its upper end. An extension 53 of the quadrant 48 is pivoted at its end upon the upper end of an arm 54 affixed to the transverse portion 26 of crank axle 25 supporting furrow wheel 17 on the side of the plow opposite land wheel 16. Power for simultaneously vertically moving rear furrow wheel 18 with the movement of land and furrow wheels 16 and 17 is likewise transmitted through a mechanism hereinafter to be described.

To the rear end of beam 12 is affixed a bracket 55 comprising laterally spaced plates 56 and 57 attached by bolts 58 to opposite sides of beam 12. Bracket 55 is provided with a rearwardly extending portion, in the end of which is journaled a shaft 59 on a rearwardly extending axis as best shown in Figure 1. This shaft extends between the plates 56 and 57, which are spaced by a sleeve 60 surrounding the shaft and upon which is pivotally mounted for forward rocking movement a sleeve 61 having integral therewith a forwardly extending lug 62 (see Figure 3). Extending through sleeve 61 and rotatable therein is the generally vertically extending portion 63 of an axle 64 having a rearwardly bent portion 65 bent at its end to receive the rear furrow wheel 18.

The forwardly extending end of lug 62 is pivotally connected by a link 66 with an arm 67 of a bell-crank 68 pivoted upon a pin 69 extending between the upper portions of plates 56 and 57. Another arm 70 of bell-crank 68 is provided at its upper end with a bracket 71 apertured to receive for sliding movement a forwardly extending rod 72, the forward end of which is pivotally connected to the upper end of arm 45 on crank axle 19. The rear end of rod 72, projecting through the bracket 71, is threaded and provided with a nut 73 adapted to abut the bracket 71. Thus, movement of crank axle 19 is transmitted through arm 45, rod 72, crank 68, and link 66 to rock sleeve 61, carrying axle 64, about the pivot point 59 to vertically move rear furrow wheel 18 with respect to the plow bottom 15 simultaneously with such vertical movement of land and furrow wheels 16 and 17.

As has been pointed out before, it is important when the plow is in ground-working position that the rear furrow wheel 18 not be permitted to caster upon the forward or rearward movement of the plow. It is likewise important that the rear furrow wheel be prevented from castering when the plow is in transport position and is to be backed up as into a shed for storage purposes. In such case, it is desirable that the furrow wheel 18 travel in a straight line, so that the plow may be properly guided. On the other hand, when the plow is moving forward in transport position, it is desirable that the rear furrow wheel be permitted to caster so that it will properly follow behind the plow and will not wobble or scrape over the ground when the plow is turned. The mechanism by which the rear furrow wheel 18 is releasably held against castering is designated at 74 and clearly illustrated in Figures 5 and 6. This mechanism includes a pin 75 transversely extending through an opening in the upper end of portion 63 of axle 64. Pivoted upon this pin 75 and upon opposite sides of the portion 63 are the depending arms of a yoke 76 to the upper end of which is affixed an upstanding cylindrical peg 77. Yoke 76 may thus be pivoted upon pin 75 and assume angular positions with respect thereto. When yoke 76 is extending vertically, peg 77 is in alinement with the axis of axle 63. Affixed to the upper end of sleeve 61 is a split collar 78 removably secured to the sleeve by a bolt 79. Likewise secured to collar 78, as by welding, are ears 80 and 81 projecting from opposite sides of the collar and having upwardly extending portions apertured to receive respectively pins 82 and 83. Also pivoted upon pins 82 and 83 are the depending arms of a yoke 84 spanning axle 63 and yoke 76 and having a transverse portion 85 apertured to receive and confine peg 77. Pins 82 and 83 are held against displacement by cotter keys 86 and are in axial alinement with pin 75.

Affixed to one of the depending arms of yoke 84, as by welding, is a lever 87 having attached to the upper end thereof an eye bolt 88 (see Figure 1).

Figure 2:
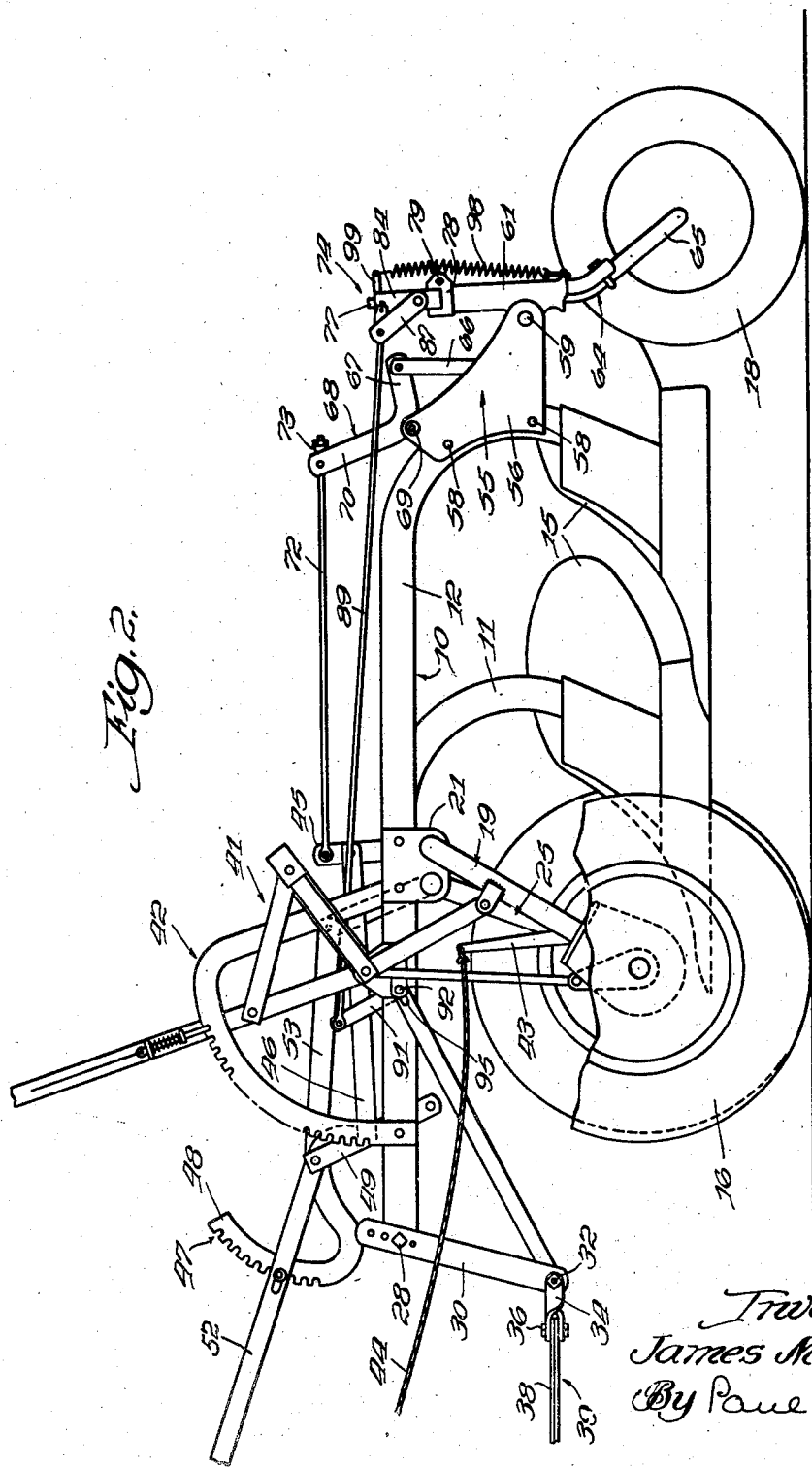
Figure 2 is a side elevation of the plow shown in Figure 1 in transport position.
Figure 3:
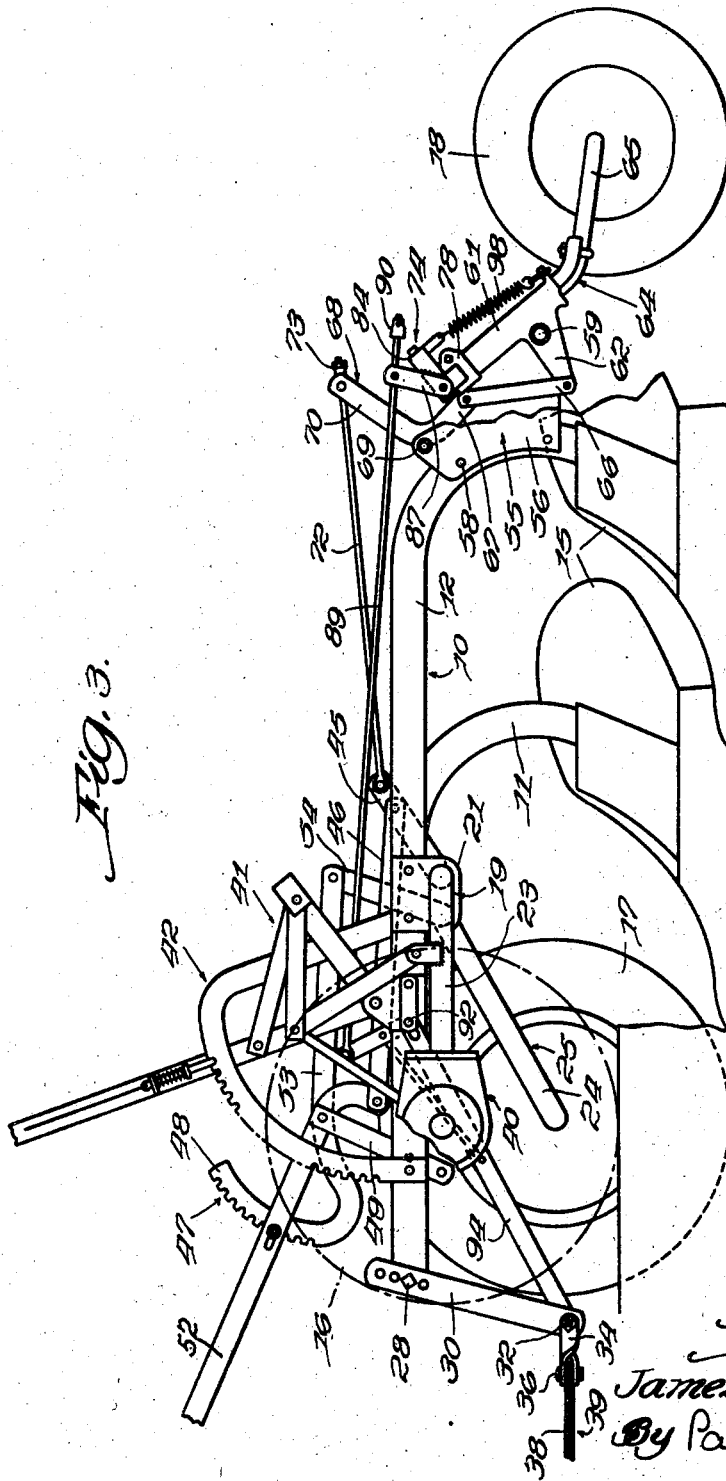
Figure 3 is a side elevation of the plow shown in Figures 1 and 2 with the plow bottoms in ground-working position.

At this point, it should be evident that when yoke 76 extends vertically upwardly and peg 77 is substantially in line with the axis of axle 63, as shown in Figs. 2, 5, and 6, axle 63 is free to rotate, carrying therewith yoke 76, peg 77 rotating in the opening in transverse portion 85 of yoke 84. However, upon rocking movement of lever 87 and therefore of yoke 84, to a position at an angle with respect to axle 63, yoke 76 is caused to assume the same angle, and axle 63 is held against rotation by peg 77 bearing against the opening in yoke 84, thus effectively locking wheel 18 against castering. This locked position is shown in Figures 1, 3, and 4.

Extending through eye bolt 88 in the upper end of lever 87 is a forwardly extending rod 89 provided at its rear end with a collar 90 adapted to abut against the eye bolt. The forward end of rod 89 is pivoted upon an arm 91, the lower end of which is pivoted upon a bolt 92 extending through the beam 12. Likewise connected to arm 91 at a point above the pivot 92 is a link 93, which extends forwardly and downwardly and is bent outwardly for insertion in an aperture in a brace member 94. The forward end of brace 94 is pivoted upon the bolt 32, and the rear end thereof is provided with a slot 95 adapted for the reception of bolt 92. Straps 29 and 30 are connected at their upper ends by a brace 96, and strap 29 on the furrow side of the plow is braced against longitudinal pivotal movement by a brace 97 having its rear end secured to beam 11 and its forward end mounted upon the bolt 31. Brace 94, provided with the slot 95, has limited longitudinal movement permitting pivoting of strap 30 about the bolt 28 and longitudinal movement of hitch bar 38. Since draft from the source of power is taken principally through hitch bar 38 on the land-side of the plow, the application of draft thereto causes forward movement of hitch bar 38 and brace 94 until bolt 92 abuts the rear end of slot 95, as viewed in Figures 2 and 3. Thus, draft upon the hitch structure 39 is transmitted through brace 94, link 93, arm 91, and rod 89 to the lock mechanism 74 to pivot yoke 84 upwardly and cause peg 77 to assume a position substantially in alinement with axle portion 63, thus permitting rotation of the axle in the sleeve 61.

Since it is only desirable that furrow wheel 18 caster upon forward movement of the plow in transport position, locking mechanism 74 is biased to locked position, that is, an angular position of yokes 76 and 84 with respect to axle 63, by a spring 98 connected at its upper end to a lug 99 projecting from yoke 84 and at its lower end to the sleeve 61. Therefore, it should be clear that when forward movement of the plow is stopped by the cessation of draft thereupon, spring 98 causes hinged yoke 84 to assume an angular position with respect to axle 63 and causing brace 94 to move rearwardly until bolt 92 abuts the forward end of slot 95.

Having now described the invention in its preferred embodiment, it should be understood that modifications may be made therein without departing from the spirit of the invention or the scope of the appended claims.

What is claimed is:

1. In a plow, a frame, ground-working tools attached to the frame, a furrow wheel upon the frame, means for locking said furrow wheel against castering when the plow is in ground-working and transport positions, and means for automatically releasing said locking means only upon forward movement of the plow when in transport position.

2. In a plow, a frame, ground-working tools attached to the frame, a draft structure attached to the frame and having a hitch point, a furrow wheel upon the frame, means for locking said furrow wheel against castering when the plow is in ground-working and transport positions, and means for releasing said locking means only upon forward movement of the plow when in transport position.

3. In a plow, a frame, ground-working tools attached to the frame, a draft structure attached to the frame and having a hitch point, a furrow wheel upon the frame, means for locking said furrow wheel against castering when the plow is in ground-working and transport positions, and means responsive to draft upon the draft means for releasing said locking means upon forward movement of the plow when in transport position.

4. In a plow, a frame, ground-working tools attached to the frame, a draft structure attached to the frame and having a hitch point, a furrow wheel upon the frame, means for locking said furrow wheel against castering when the plow is in ground-working and transport positions, and means connecting said draft means and said locking means and effective upon the application of draft to said draft means to release said locking means upon forward movement of the plow in transport position.

5. In a plow, a frame, ground-working tools attached to the frame, a draft structure attached to the frame and having a hitch point, a furrow wheel upon the frame, means for locking said furrow wheel against castering when the plow is in ground-working and transport positions, and means having lost motion connecting said draft means and said locking means and effective upon the application of draft to said draft means to release said locking means.

6. In a plow, a frame, ground-working tools attached to the frame, a draft structure attached to the frame and having a hitch point, a furrow wheel upon the frame, means for locking said furrow wheel against castering, means biasing said locking means to locking position, and means responsive to draft upon the draft means for overcoming the biasing action of said biasing means only upon forward movement of the plow when in transport position.

7. In a plow, a frame, ground-working tools attached to the frame, a draft structure attached to the frame and having a hitch point, a furrow wheel upon the frame, means for locking said furrow wheel against castering, means biasing said locking means to locking position, and means connecting said draft means and said locking means and effective upon the application of draft to said draft means to overcome the biasing action of said biasing means.

8. In a plow, a frame, ground-working tools attached to the frame, a draft structure attached to the frame and having a hitch point, a furrow wheel upon the frame, means for locking said furrow wheel against castering, means biasing said locking means to locking position, and means having lost motion connecting said draft means and said locking means and effective upon the application of draft to said draft means to overcome the biasing action of said biasing means.

9. In a plow, a frame, ground-working tools attached to the frame, a draft structure attached to the frame and having a hitch point, wheels supporting the plow, a furrow wheel pivoted upon the rear of the frame, means for moving the plow to and from working position, means for locking the furrow wheel against castering upon forward or rearward movement of the plow when in ground-working position, means for locking the furrow wheel against castering upon rearward movement thereof when in transport position, and means responsive to draft upon the draft means for releasing the furrow wheel locking means when in transport position to permit castering of said furrow wheel only upon forward movement thereof.

10. In a plow, a frame, ground-working tools attached to the frame, a draft structure attached to the frame and having a hitch point, wheels supporting the plow, a furrow wheel pivoted upon the rear of the frame, means for moving the plow to and from working position, means for locking the furrow wheel against castering upon forward or rearward movement of the plow when in ground-working position, means responsive to draft upon the draft means for releasing the furrow wheel locking means when in transport position to permit castering of said furrow wheel upon forward movement thereof, and means for automatically locking the furrow wheel against castering upon rearward movement thereof when in transport position.

11. In a plow, a frame, ground-working tools attached to the frame, a draft structure attached to the frame and having a hitch point, wheels supporting the plow, a furrow wheel pivoted upon the rear of the frame, means for moving the plow to and from working position, means for locking the furrow wheel against castering upon forward or rearward movement of the plow when in ground-working position, means for locking the furrow wheel against castering upon rearward movement thereof when in transport position, means responsive to draft upon the draft means for releasing the furrow wheel locking means when in transport position to permit castering of said furrow wheel only upon forward movement thereof, and means operative in both ground-working and transport positions for biasing the said locking means to locked position.

12. In a plow, a frame, ground-working tools attached to the frame, a support movably mounted on the frame, a furrow wheel carried by the support, means for moving said support to raise and lower the plow, said support being arranged for axial rotation to permit castering of the furrow wheel, a member pivoted upon said support and adapted for movement to positions in axial alinement with and at an angle with respect to said support, and stop means carried by the frame and engageable with said member, said stop means being effective only in an angular position of said member with respect to said support to prevent rotation thereof.

13. In a plow, a frame, ground-working tools attached to the frame, a support movably mounted on the frame, a furrow wheel carried by the support, means for moving said support to raise and lower the plow, said support being arranged for axial rotation to permit castering of the furrow wheel, a member pivoted upon said support and adapted for movement to positions in axial alinement with and at an angle with respect to said support, and stop means carried by the frame and engageable with said member, said stop means being effective only in an angular position of said member with respect to said support to prevent rotation thereof and means biasing said member to an angular relationship with respect to said support.

14. In a plow, a frame, ground-working tools attached to the frame, a draft structure attached to the frame and having a hitch point, a support movably mounted on the frame, a furrow wheel carried by the support, means for moving said support to raise and lower the plow, said support being arranged for axial rotation to permit castering of the furrow wheel, a member pivoted upon said support and adapted for movement to positions in axial alinement with and at an angle with respect to said support, and stop means carried by the frame and engageable with said member, said stop means being effective only in an angular position of said member with respect to said support to prevent rotation thereof, means biasing said member to an angular relationship with respect to said support, and means responsive to draft upon the draft means for overcoming the biasing action of said biasing means.

15. In a plow, a frame, ground-working tools attached to the frame, a draft structure attached to the frame and having a hitch point, a support movably mounted on the frame, a furrow wheel carried by the support, means for moving said support to raise and lower the plow, said support being arranged for axial rotation to permit castering of the furrow wheel, a member pivoted upon said support and adapted for movement to positions in axial alinement with and at an angle with respect to said support, and stop means carried by the frame and engageable with said member, said stop means being effective only in an angular position of said member with respect to said support to prevent rotation thereof, means biasing said member to an angular relationship with respect to said support, and means connecting said draft means and said member and effective upon the application of draft to said draft means to overcome the biasing action of said biasing means upon forward movement of the plow when the plow is in transport position, but ineffective to overcome the biasing action when the plow is in working position or backing up in transport position.

16. In a plow, a frame, ground-working tools attached to the frame, a bearing sleeve movably mounted on the frame, an axle mounted for axial rotation in said sleeve, a wheel carried by the axle, a member pivoted upon the axle and movable to positions in axial alinement with and at an angle with respect to said axle, a part pivoted upon the sleeve engageable with said member and movable therewith, said part being effective to prevent rotation of said axle in an angular position of the member with respect thereto, but ineffective to prevent rotation of the axle when the member is in axial alinement therewith, resilient means biasing said member to an angular position with respect to the axle, and means for overcoming the biasing action of said resilient means.

JAMES MORKOSKI.